United States Patent Office 2,922,727
Patented Jan. 26, 1960

2,922,727
METHOD OF TREATING POLYAMIDE TIRE CORD WITH CAPROLACTAM OLIGOMERS

Robert Levison, Arnhem, Netherlands, assignor to American Enka Corporation, Enka, N.C., a corporation of Delaware No Drawing. Application February 7, 1956
Serial No. 563,852

Claims priority, application Netherlands
February 14, 1955

3 Claims. (Cl. 117—138.8)

This invention relates to an improved process for the manufacture of automobile tire cord, and to an improved automobile tire cord per se.

It is known that synthetic yarns manufactured from synthetic linear polyamides are used for the manufacture of automobile tire cord. Although in principle almost any polyamide may be employed for that purpose, yet yarns manufactured from the polyamide produced by the polymerization of hexamethylene diamine and adipic acid (known under the generic name of nylon 66) and yarns manufactured from the polyamide produced by the polycondensation of $\epsilon$-aminocaproic acid (known under the generic name of nylon 6) are particularly useful. Furthermore, it is also known to manufacture automobile tire yarns from yarns derived from super polyurethanes as well as from super polyesters such as the polymerization product of terephthalic acid and ethylene glycol.

It is well known that the bonding of all such yarns to the rubber presents certain difficulties in the manufacture of tires, and so it has been proposed to improve this bonding by soaking the yarn in an aqueous solution containing a cyclic lactam of an amino carboxylic acid, in particular lactam of $\epsilon$-aminocaproic acid, drying this yarn and processing it into tires. Although an improvement in some respects was achieved by this method, yet many other difficulties were encountered which are probably connected with, or may be traced to, the relatively low melting point (68° C.) of the lactam employed as well as other unexplained reasons, so that the over-all result was not always satisfactory.

According to the present invention, a method has been discovered by means of which the adhesion of synthetic fibers to rubber may be improved in a thoroughly reliable way. The invention also includes the resulting composite rubber-synthetic fiber product having greatly improved adhesion characteristics.

According to the present invention, for the manufacture of automobile tire cord a yarn is used which contains oligomers of caprolactam, particularly di- and trimers, the oligomer content exceeding the monomer content and this monomer content being at most 2% by weight.

Oligomers, in accordance with the present invention, are defined as the polymers of caprolactam in which each polymer molecule does not contain more than five molecules of caprolactam. These oligomers are soluble in cold water only to a certain degree but they dissolve much better in hot water and in liquids containing methanol and ethanol.

It should be noted that the presence of monomeric lactam, provided the proportion thereof is less than 2% by weight, has no disturbing influence.

Good results are obtained when the synthetic yarn used for the manufacture of the tire yarn has an oligomer content of at least 1% by weight, the monomeric lactam content therefore being less than 1% by weight. The best results are obtained with an oligomer content between 1 and 4% by weight, the monomeric lactam content never exceeding 2% by weight.

For many textile purposes it is often deemed desirable to manufacture a yarn which is as far as possible free from monomers and oligomers. For this purpose the polymer granules are generally washed prior to spinning yarn from them or alternatively the yarn is washed after spinning, both in a known manner. The wash water is mostly reprocessed to caprolactam (in the case of yarn manufactured e.g. from polycaprolactam) which is again suitable for polymerization. However, it is easy to obtain from this wash water an oligomer mixture containing only a slight amount of caprolactam because in cold water the oligomeric material dissolves only to a small extent while the monomeric caprolactam dissolves very well.

For the manufacture of yarns of the correct oligomer content one may employ the solubility characteristics of the oligomeric material in hot water and in methanol or ethanol, and it is possible in this way readily to obtain a yarn of a sufficient oligomer content simply by soaking the yarns for a suitable period, for instance a few hours, in a saturated solution of the desired oligomers.

In addition to the impregnation of finished yarns with solutions of oligomers, yarns having the correct oligomer content may also be conveniently produced in other ways. In certain cases, for example, the manufacture of the polymers or the spinning process may be carried out in such fashion that yarns of the desired oligomer content are obtained directly. This is readily feasible in the case of the manufacture of polyamide yarns from $\epsilon$-caprolactam. By adopting certain measures, known per se, in the polymerization of the $\epsilon$-caprolactam or by using a reduced pressure and/or the action of steam on the molten polymer, the desired relatively low monomeric lactam content with the higher oligomer content in the threads may be readily attained. From such a polymer a yarn may be spun which contains only a small amount of caprolactam (less than 2% by weight) but of which the oligomer content may for example range from 2.5 to 3% by weight, whereas without the application of the above measures the monomeric lactam content generally amounts to 6–8% by weight.

In order to obtain a satisfactory tire yarn the yarn should (contrary to the usual procedure) not be washed out in such a way that the oligomer content decreases. It should be noted that if this yarn, on application of the usual dip, is brought into contact with aqueous solutions, this does not, as a practical matter, result in a decrease of the oligomer content. However, if desired, oligomer may also be added to the dip in order to counteract any possible tendency toward a decrease of the oligomer content of the yarn processed therein.

The manner in which the foregoing features of the invention are attained will appear more fully from the following description thereof, in which reference is made to typical and preferred procedures in order to indicate more fully the nature of the invention, but without intending to limit the invention thereby.

*Example I*

Various comparative tests were carried out with a yarn spun in a manner known per se from polycaprolactam (nylon 6), said yarn consisting of 140 filaments and having a denier of 840 and containing 7% by weight of monomeric lactam as well as 3% by weight of oligomers.

In the first place the yarn was plied as such to form a cord of the twist formula 12/12 whereupon the bonding thereof to rubber was determined in a manner known per se. The "bonding value" (that is the force required to tear the yarn from the rubber in which it is embedded in the standard way) was determined to be 4.7 kg.

For purposes of comparison, the same yarn was washed with hot water, prior to being contacted with the rubber, until the monomer content thereof amounted to only a few tenths of a percent by weight and the oligomer content to about 0.7% by weight. The bonding value to rubber of a cord made from the washed yarn did not substantially differ from the above-mentioned bonding value and amounted to 5 kg.

The application of monomeric lactam to the yarn surface prior to the contacting with rubber did not result in an appreciable improvement; the bonding value in this case was between 5 and 6 kg.

Thereupon a polycaprolactam yarn was manufactured by a process wherein the molten polymeric product was first subjected to a greatly reduced pressure. The monomer cotent of the product thus obtained amounted to 0.5% by weight and the oligomer content to 3% by weight. The bonding value to rubber of yarn made from this product was determined at once; this amounted to 8.5 kg.

Finally a polycaprolactam yarn was spun from a polymerization product which was treated with steam in a manner known per se. As a result of the steam treatment the yarn had a monomer content of 1.5% by weight and an oligomer content of 3.5% by weight. In this case the bonding value was about 8 kg.

*Example II*

A yarn was manufactured in the known manner from the condensation product of hexamethylene diamine and adipic acid (nylon 66). This yarn was doubled as such according to the twist formula 12/12, whereupon the bonding to rubber was determined; this bonding amounted to only 4 kg. Part of the yarn was soaked for 2.5 hours at a temperature of 45° C. in a saturated methanol solution of oligomers of caprolactam. After centrifuging and evaporating the methanol it was found that the oligomer content of this yarn amounted to 1.2% by weight. After doubling and processing with rubber a bonding value of 7.4 kg. was obtained.

Similar results were obtained with threads derived from other linear polycondensation products, such as polyurethanes and polyesters, the threads being soaked in a solution of oligomers of caprolactam.

Not only polyamides produced from caprolactam but also those which are prepared by polycondensation from various dicarboxylic acids and diamines may be advantageously treated in accordance with the present invention. Since the polyamides per se are well known and form no part of the present invention it is deemed unnecessary in the interests of brevity to do more than refer to typical prior art disclosures illustrative thereof merely by way of example, such as Du Pont's U.S. patents to Carothers including Nos. 2,071,250-3 and 2,130,948 and the "Collected Papers of Wallace Hume Carothers on High Polymeric Substances," Interscience Publishers, Inc., New York, 1940.

While specific examples of preferred methods and products embodying the present invention have been set forth above, it will be understood that many changes and modifications may be made therein without departing from the spirit of the invention. It will therefore be understood that the examples cited and the particular proportions and methods of operation set forth above are intended to be illustrative only, and are not intended to limit the scope of the invention.

What is claimed is:

1. Method of treating polyamide yarn to increase the adhesion thereof to rubber comprising impregnating a polyamide yarn with a solution containing caprolactam oligomers and then drying the impregnated yarn, the dried yarn having an oligomer content of at least 1% by weight.

2. Method of treating polyamide yarn to increase the adhesion thereof to rubber comprising impregnating polyhexamethylene adipamide yarn with a solution containing caprolactam oligomers and then drying the impregnated yarn, the dried yarn having an oligomer content between 1 and 4% by weight.

3. Method of treating polyamide yarn to increase the adhesion thereof to rubber comprising impregnating polyhexamethylene adipamide yarn with a methanol solution containing caprolactam oligomers and then drying the impregnated yarn, the dried yarn having an oligomer content between 1 and 4% by weight.

References Cited in the file of this patent

UNITED STATES PATENTS

| | | |
|---|---|---|
| 2,402,021 | Compton | June 11, 1946 |
| 2,514,187 | Bosomworth | July 4, 1950 |

FOREIGN PATENTS

| | | |
|---|---|---|
| 557,544 | Great Britain | Nov. 25, 1943 |
| 650,155 | Great Britain | Feb. 14, 1951 |
| 693,376 | Great Britain | July 1, 1952 |